United States Patent Office 3,830,800
Patented Aug. 20, 1974

3,830,800
PROCESS FOR THE PREPARATION OF
HEXAMETHYLENEIMINE
Loren D. Brake, Wilmington, Del., assignor to E. I. du Pont de Nemours and Company, Wilmington, Del.
No Drawing. Filed May 1, 1972, Ser. No. 249,616
Int. Cl. C07d 41/02
U.S. Cl. 260—239 B          7 Claims

ABSTRACT OF THE DISCLOSURE

Hexamethylenediamine is deaminated and cyclized to hexamethyleneimine in high yields by heating hexamethylenediamine to a temperature of from 180° to 300° C. in the presence of from 0.001 to 10 weight percent, calculated as ruthenium metal and based on the starting weight of hexamethylenediamine, of a specifically prepared ruthenium catalyst, the ruthenium being supported on an inert carrier.

BACKGROUND OF THE INVENTION

The compound hexamethyleneimine is useful as an intermediate, e.g., it is an intermediate for the herbicide, S-ethyl hexahydro-1H-azepine-1-carbothioate.

The art has taught the hydrogenation of O-methyl caprolactim to hexamethyleneimine employing various hydrogenation catalysts. The use of a barium-copper chromite catalyst gave a 70% yield of hexamethyleneimine, Raney nickel a 49% yield, and ruthenium a 31% yield. See Richard E. Benson and Theodore L. Cairns, JACS, 70, 2115–18 (1948). Karl Ziegler in British Pat. No. 803,178 describes the hydrogenation of caprolactam using aluminum dialkyl hydride to prepare hexamethyleneimine in a 73% yield.

Jiro Yasumura, Nippon Kagaku Zasshi, 82, 1700–2 (1961) describes the deamination of hexamethylenediamine over a Raney nickel catalyst. A 12% yield of hexamethyleneimine is reported along with a large high boiling polymer residue.

U.S. Pat. 3,268,588 describes a process for preparing hexamethyleneimine from hexamethylenediamine using Raney nickel, cobalt or copper catalyst in the presence of hydrogen. A yield of about 50% is reported.

SUMMARY OF THE INVENTION

I have discovered that hexamethylenediamine can be converted into a hexamethyleneimine in high yields by deamination and cyclization if a specially prepared ruthenium catalyst on an inert support is employed.

The specially prepared ruthenium catalyst is prepared as discussed in Example 11 of U.S. Pat. 2,606,925, i.e., by the fusing together of ruthenium dioxide, potassium hydroxide and potassium nitrate.

In the process of the invention, the catalyst is present at a concentration of from 0.001 to 10 percent based on the weight of hexamethylenediamine and calculated as metallic ruthenium, and the temperature of the reaction will range from 180° to 300° C.

Using the preferred operating conditions of 225–250° C., from 0.01 to 1 weight percent ruthenium, and restricting the reaction time such that the conversion is less than 50%, a yield of hexamethyleneimine of greater than 90% can be obtained.

The ruthenium catalyst of the process of the invention is an unusually specific cyclizing, deamination catalyst. This catalyst provides yields of hexamethyleneimine greater than 90% at conversions of 10 to 50% by weight of the hexamethylenediamine. Higher conversion results in the formation of two byproducts, N,N-hexamethylene 1,6-hexanediamine and 1,6-bis(hexamethyleneimino) hexane, e.g., at 100% conversion of the hexamethylenediamine, the yield of hexamethyleneimine is about 50% with the other 50% being the byproducts set forth above.

Further, the catalyst used inhibits the formation of bis-hexamethylenetriamine as a by-product, other catalysts, including other ruthenium catalysts yield this byproduct. This side reaction accounts for the formation of straight chain byproducts containing three, four or more hexamethylene groups.

DETAILED DESCRIPTION OF THE INVENTION

The starting hexamethylenediamine can be obtained in any suitable way. For example, the methods of Jefferson, Smith, and Stiles, U.S. Pat. No. 2,776,315, or Carss and Leyshon, U.S. Pat. No. 3,488,390 describe the preparation of hexamethylenediamine by the hydrogenation of adiponitrile.

The catalyst useful in the process of the invention is prepared as described in Example 11 of U.S. Pat. 2,606,925. Thus the catalyst can be prepared in the following manner:

Ten parts of ruthenium dioxide was fused with 50 parts of potassium hydroxide. To the fused mass, there was added 10 parts of potassium nitrate over a 5 minute period, and the mixture maintained at the fusion point for one hour. Thereafter it was allowed to cool and dissolved in 120 parts of distilled water. The resulting solution was poured over activated charcoal which had been previously washed with a 10% solution of potassium hydroxide and dried at 110° C. for 48 hours. The volume ratio of solution to activated charcoal was 2:3. The impregnated charcoal was then heated to about 50° C., 15 parts of methanol was added, and the composition dried at 110° C. The resulting composition contained about 4.5% of ruthenium dioxide.

In the preparation above, the ruthenium catalyst was supported on carbon. The ruthenium can be supported on any inert carrier such as alumina, barium sulfate, kieselguhr, pumice, diaspore, bauxite, periclase, zirconia, diatomaceous earth, calcium sulfate, calcium oxide, barium carbonate, strontium carbonate, silica, silica-alumina, calcium carbonate and single or mixed oxides, carbonates, or mixed oxide-carbonate and single or mixed oxides, carbonates, or mixed oxide-carbonates of rare earth metals such as lanthanum, cerium, praseodymium, neodymium, promethium, samarium, europium, gadolinium, terbium, dysprosium, holmium, erbium, thalium, ytterbium, lutertium, and yttrium. Suitable inert carriers are described in Chapter 7 of *Catalysis* by S. Berkman, J. C. Morrell, and G. Egloff, Reinhold Publishing Corp., New York (1940), or Chapter 6 of *Catalysis Vol. 1* by P. H. Emmett, Reinhold Publishing Corp., New York (1940). The preferred supports include carbon, alumina, kieselguhr, or barium sulfate, and the most preferred is carbon.

The thus prepared ruthenium catalyst will be used according to the present invention in an amount of at least 0.001 weight percent and less than about 10 weight percent, based on the starting hexamethylenediamine and calculated as metallic ruthenium, and preferably in amounts of from 0.01 to 1 weight percent of the same basis.

In carrying out the process, the hexamethylenediamine is subjected to a temperature of from 180° C. to 300° C. in a liquid phase reactor under autogenous pressure or in a vapor phase reactor in the presence of the ruthenium catalyst. Optionally, a solvent or diluent can be present.

The solvents or diluents which can be used according to this invention are generally organic solvents or inert gases which are not subject to reaction under the conditions of this process. In general, saturated alicyclic and aliphatic solvents are suitable including alicyclic and aliphatic hydrocarbon ethers. Representative of suitable solvents are n-hexane, cyclohexane, dioxane, ethyl ether, isopropyl ether, n-propyl ether, n-butyl ether, isobutyl ether, amyl ether, tetrahydrofuran, dicyclohexyl ether, and the like. The preferred solvent is dioxane. Inert gases which can be used include nitrogen, helium, argon, methane, and the like and the most preferred gas is nitrogen.

The process of the invention is carried out at elevated temperatures. Temperatures on the order of 180° C. to 300° C., and preferably about 225° C. to 250° C. can be used.

The liquid phase reaction is ordinarily run at autogenous pressure. Higher pressures with inert gases can, of course, be used but little practical advantages are seen from this. Similarly, the gas phase reaction can also be run at elevated pressures; however, atmospheric pressure still permits smooth operation. High pressures will ordinarily be avoided. Pressures less than 5000 pounds per square inch represent the practical limits for reasons of cost of operation and equipment.

The process is carried out for a time sufficient to reach the desired conversion of hexamethylenediamine, i.e., less than 50% conversion and usually between 10 and 50% conversion. Most frequently, the desired conversion in a liquid phase reactor will be obtained in less than two hours, and ordinarily less than 30 minutes. In a vapor phase reactor, contact times of one minute or less are desired. Once the optimum conversion of hexamehtylenediamine is obtained, addittional holdup or exposure under the conditions of this invention, at high concentrations of hexamethylenediamine and hexamethyleneimine can lead to the formation of byproducts.

By following the above procedures, hexamethylenediamine is converted to hexamethyleneimine in high yields with little or no byproducts being formed. This method eliminates the formation of bis-hexamethylenetriamine which is normally formed as the major byproduct in the catalytic deamination of hexamethylenediamine.

The only two byproducts found are 6-(hexamethyleneimino)-hexylamine, and 1,6-bis - (hexamethyleneimino) hexane. The formation of 6-(hexamethyleneimino)hexylamine is not observed except at high conversions of hexamethylenediamine, ordinarily above 50%. It is possible by operating the process at high concentrations and/or conversions to prepare either of the two byproducts in good yields. Thus, at 100% conversions of hexamethylenediamine, the yield of hexamethyleneimine is about 50% with the remainder being these two byproducts. The two byproducts can be used in many applications wherein an amine is needed. The yield of each can be optimized by recycling unconverted hexamethylenediamine, along with hexamethyleneimine and/or 6-(hexamethyleneimino)hexane, depending on the desired product.

It will be understood by those skilled in the art that this process can be carried out in a batch operation, or in a continuous or semi-continuous operation. It will also be understood that in a continuous process utilizing thorough back-mixing, the quantities of catalyst used will still be within the range set out above, but the quantities will be calculated on the basis of total reactor content rather than on the basis of initial charge.

It will also be readily appreciated that the process can encompass a recycle of part or all of the reaction product back into the reaction zone where it is subjected to the critical conditions of the process of the present invention. Such a recycle operation permits the maximum conversion of hexamethylenediamine to the desired product. Such recycle operations can involve the separation of part of the reaction products and can, for example, recycle the unconverted hexamethylenediamine back into the main reaction where it is subjected to the conditions of the present invention. Overall, this achieves a remarkably high yield of the desired product with production of little or no unwanted byproducts.

This invention will be better understood by reference to the following illustrative examples, wherein parts and percentages are by weight, unless otherwise specified.

EXAMPLE 1

At a temperature of 225° C., 300 parts hexamethylenediamine and 500 parts dioxane were heated for one hour under autogenous pressure in the presence of 20 parts of a ruthenium on carbon catalyst in a stirred pressure vessel. The resulting mixture was freed of catalyst by filtration. Distillation under vacuum gave 70 parts hexamethyleneimine and 210 parts hexamethylenediamine. The hexamethyleneimine was recovered in a 91% yield based on the hexamethylenediamine converted. No bis-hexamethylenetriamine was recovered by distillation, nor could any be detected by gas chromatographic analysis.

The catalyst used in the above experiment was prepared as follows:

3.4 parts of ruthenium dioxide was fused with 17 parts of potassium hydroxide. To the fused mass there was added 3.4 parts of potassium nitrate over a 5 minute period, and the mixture maintained at the fusion point for one hour. Thereafter, it was allowed to cool and dissolved in 80 parts of distilled water. The resulting solution was poured over 50 parts of activated charcoal, the charcoal having previously been washed with a 10% solution of potassium hydroxide and dried at 110° C. for 48 hours. The impregnated charcoal was then heated to about 50° C., 5 parts of methanol was added, and the composition dried at 110° C. The resulting composition contained about 4.0% ruthenium.

EXAMPLE 2

At a temperature of 250° C., 200 parts hexamethylenediamine and 400 parts dioxane was heated for 30 minutes under autogenous pressure in the presence of 19.7 parts of the ruthenium catalyst recovered from Example 1. Recovery of the product as in Example 1 gives a 94% yield of hexamethyleneimine at a 24% conversion of hexamethylenediamine. No bis-hexamethylenetriamine was detected by gas chromatographic analysis.

EXAMPLE 3

Example 2 was repeated three times using the catalyst recovered from Example 2 in each succeeding batch. Similar results were obtained demonstrating that the catalyst can be reused without deactivation.

EXAMPLE 4

At a temperature of 280° C., 200 parts hexamethylenediamine and 500 parts di-n-butyl ether is heated in a stirred pressure vessel for 20 minutes under autogenous pressure in the presence of 20 parts of the ruthenium on carbon catalyst described in Example 1. The resulting mixture is freed of catalyst by filtration. Distillation under vacuum will give 66 parts hexamethyleneimine and 116 parts hexamethylenediamine. The hexamethyleneimine will be recorded in a 92% yield based on the hexamethylenediamine converted.

EXAMPLE 5

At a temperature of 200° C., 400 parts hexamethylenediamine and 500 parts cyclohexane were heated for one hour under autogenous pressure in the presence of 20 parts of the ruthenium on carbon catalyst described in Example 1 in a stirred pressure vessel. The resulting mixture was freed of catalyst by filtration. Distillation under vacuum gave hexamethyleneimine in a 95% yield based on the hexamethylenediamine converted.

EXAMPLE 6

The following tests compare commercial ruthenium catalysts with the specially prepared catalyst of this invention.

Test 1

At a temperature of 225° C., 300 parts hexamethylenediamine and 500 parts dioxane were heated for one hour under autogenous pressure in the presence of 20 parts of the ruthenium catalyst described in Example 1 in a stirred pressure vessel.

Test 2

A test in all regards identical to Test 1 was repeated except that 20 parts of 5% ruthenium on carbon catalyst purchased from Englehard Industries, Inc. was used.

Test 3

A test in all regards identcal to Test 1 was repeated except that 20 parts of 5% ruthenium on aluminum catalyst purchased from Englehard Industries, Inc. was used.

The product from each test was freed of catalyst by filtration and analyzed by distillation for bis-hexamethylenetriamine formation. The results are summarized in the following table.

| Test | Gms. bis-hexamethylenetriamine |
|---|---|
| 1 | [1] None |
| 2 | 9.0 |
| 3 | 29.0 |

[1] None detected by gas chromatographic analysis.

What is claimed is:

1. An improvement in the process for converting hexamethylenediamine into hexamethyleneimine by deamination and cyclization characterized in that the hexamethylenediamine is brought into contact with a ruthenium catalyst on a support, said catalyst being made by fusing together ruthenium dioxide, potassium hydroxide and potassium nitrate.

2. The process of claim 1 wherein the ruthenium catalyst is supported on carbon.

3. A process for the conversion of hexamethylenediamine into hexamethyleneimine by deamination and cyclization characterized in that the hexamethylenediamine is brought into contact with 0.001 to 10% based on the weight of hexamethyleneimine and calculated as metallic ruthenium, of a ruthenium catalyst on a support, said catalyst being made by fusing together ruthenium dioxide, potassium hydroxide and potassium nitrate, the temperature at the time of contact ranging from 180° C. to 300° C. and the reaction being stopped before more than 50% of the hexamethylenediamine is converted.

4. The process of claim 3 wherein the ruthenium catalyst is supported on carbon.

5. A process for the conversio nof hexamethylenediamine into hexamethyleneimine by deamination and cyclization characterized in that the hexamethylenediamine is brought into contact with 0.01 to 1% based on the weight of hexamethyleneimine and calculated as metallic ruthenium, of a ruthenium catalyst on a support, said catalyst being made by fusing together ruthenium dioxide, potassium hydroxide and potassium nitrate, the temperature at the time of contact ranging from 225° C. to 250° C. and the reaction being stopped before more than 50% of the hexamethylenediamine is converted.

6. The process of claim 5 wherein the ruthenium catalyst is supported on carbon.

7. The process of claim 1 conducted in an inert solvent.

References Cited

UNITED STATES PATENTS

| | | | |
|---|---|---|---|
| 3,268,588 | 8/1966 | Horlenko et al. | 260—239 B |
| 2,606,925 | 8/1952 | Whitman | 260—563 |

OTHER REFERENCES

Yasumura et al.: Chem. Abstracts, vol. 59, col. 2813 (1963).

ALTON D. ROLLINS, Primary Examiner